United States Patent
Tomita

[11] 3,899,353
[45] Aug. 12, 1975

[54] THERMAL BATTERY

[75] Inventor: Masao Tomita, Takatsuki, Japan

[73] Assignee: Yuasa Battery Company Limited, Takatsuki, Japan

[22] Filed: Apr. 2, 1974

[21] Appl. No.: 457,186

[52] U.S. Cl. .............................................. 136/83 T
[51] Int. Cl.² ...................................... H01M 11/00
[58] Field of Search ................................... 136/83 T

[56] References Cited
UNITED STATES PATENTS

| | | | |
|---|---|---|---|
| 3,527,615 | 9/1970 | Clark et al. | 136/83 T |
| 3,625,767 | 12/1971 | Clark et al. | 136/83 T |
| 3,669,748 | 6/1972 | McCullough et al. | 136/83 T |
| 3,677,822 | 7/1972 | Bush | 136/83 T |
| 3,719,527 | 3/1973 | Carlsten et al. | 136/83 T |
| 3,725,132 | 4/1973 | Moser et al. | 136/83 T X |
| 3,759,749 | 9/1973 | Voyentzie et al. | 136/83 T X |

Primary Examiner—John H. Mack
Assistant Examiner—C. F. Lefevour
Attorney, Agent, or Firm—Watson, Cole, Grindle & Watson

[57] ABSTRACT

This invention relates to a novel thermal battery comprising a fusible heat reservoir arranged substantially in the middle of a cell stack made by alternately stacking many cells each consisting of a positive plate of lead chromate or calcium chromate, an electrolyte prepared by adding barium nitrite or lithium chromate to a eutectic mixture of potassium chloride and lithium chloride as a base, a negative plate of magnesium or calcium, heat pellets, and a thermal insulator surrounding its periphery as contained in a battery case. The present invention has advantages of improving the battery performance and obtaining long thermal battery life.

13 Claims, 3 Drawing Figures

THERMAL BATTERY

This invention relates to reserve batteries and more particularly to a novel thermal battery.

Usually a thermal battery comprises a stack of cells and heat pellets to heat the cells. Only in case the temperature of the electrolyte within the cell is maintained above the melting point, is the discharge of the thermal battery possible. Therefore, the discharge duration of the thermal battery is restricted by the cooling velocity of the temperature of the electrolyte within the cell. In order to increase this discharge duration, various suggestions have been already made. For example, there is a suggestion of arranging a heat reservoir in the end part of the above mentioned cell stack so that the cooling of the temperature of the electrolyte within the cell may be delayed. It has defects that, though the discharge duration can be somewhat increased, the discharge voltage can not be kept constant, is comparatively low and quickly drops during use and, as a result, the performance is not good and the life is short. The present invention is to overcome all of the above mentioned defects.

The first object of the present invention is to provide an improved thermal battery.

The second object of the present invention is to provide a thermal battery having long life.

The third object of the present invention is to provide a thermal battery which is simple and easy to produce and is inexpensive.

These objects of the present invention can be easily understood by referring to the following description and the accompanying drawings in which.

Figure 1:
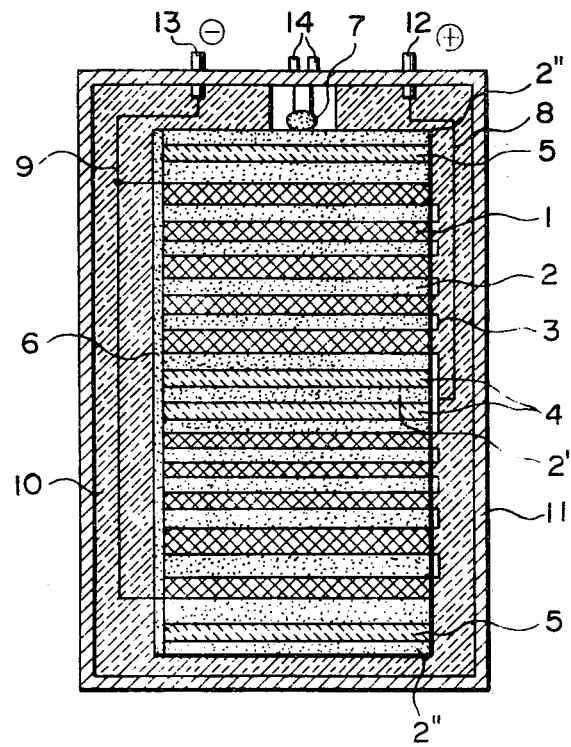
FIG. 1 is a vertically sectioned view of a thermal battery showing an embodiment of the present invention.
Figure 2:
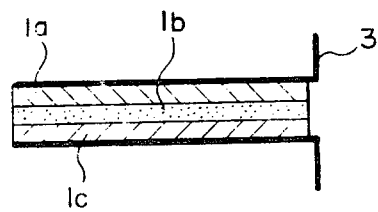
FIG. 2 is a magnified vertically sectioned view of a cell in the present invention.

In FIG. 1, 1 is a cell consisting of a positive plate 1a, electrolyte 1b and negative plate 1c as shown in detail in FIG. 2. The positive plate 1a is constituted of lead chromate or calcium chromate. The electrolyte 1b is prepared by adding barium nitrite or lithium chromate to a eutectic mixture of potassium chloride and lithium chloride as a base.

This is one of the most important features of the present invention and shall be detailed later. The negative plate 1c is made of magnesium or calcium. 2 is a heat pellet consisted of by properly molding a mixed powder of zirconium and barium chromate. Particularly, in case the mechanical strength is to be further increased, an asbestos base may be used. Many cells and heat pellets are alternately stacked to form a cell stack. 3 is a connecting piece to electrically connect respective cells with each other and consists of nickel or iron. 4 is a fusible heat reservoir which is arranged in the middle of the above mentioned cell stack, and is another most important feature of the present invention and shall be described later. 5 is a well known heat reservoir which is arranged in the end part of the above mentioned cell stack and is made of a metal plate such as steel, stainless steel or of a heat-resisting inorganic sheet such as asbestos or mica or by compressing and molding under a proper pressure a mixture of a powder of a melting point higher than the melting point of the electrolyte of the cell and such heat-resisting inorganic powder as of alumina, silica or kaolin to be formed into a layer. 6 is a train which is to ignite the heat pellet 2 and consists of the same material as of the heat pellet 2. 7 is a squib which is to ignite the pellet 2 and train 6 and consists of a well known material. 8 is a positive lead made of iron, nickel or copper. 9 is a negative lead of the same material. 10 is a thermal insulator made of glass or asbestos paper and coating the periphery of the cell stack of many cells and pellets. 11 is a battery case which contains these cells 1, pellets 2 and thermal insulator 10 and is made, for example, of stainless steel. 12 is a positive terminal. 13 is a negative terminal. 14 is an igniting terminal As described above, one of the features of the present invention is the electrolyte. A eutectic mixture of potassium chloride and lithium chloride is already used as a well known electrolyte. The discharge capacity of a thermal battery using such electrolyte is comparatively small. In order to further increase the discharge capacity, the electrolyte in the present invention is prepared by adding barium nitrite to a eutectic mixture of potassium chloride and lithium chloride as a base. Some examples of the method of preparing this electrolyte are as shown in the following.

A mixture of 70% by weight of a eutectic mixture of potassium chloride and lithium chloride and 30% by weight barium nitrite is heated and dissolved at 450°C and asbestos paper or glass fiber cloth is dipped in the solution to obtain an electrolyte layer.

48% by weight of a eutectic mixture powder of lithium chloride and potassium chloride, 12% by weight barium nitrite and 40% by weight kaolin powder are uniformly mixed and are molded to be in the form of a plate under a pressure, for example, of 4 tons/cm$^2$ to obtain an electrolyte layer. The larger the amount of addition of barium nitrite, the larger the discharge capacity obtained. However, if the amount is too large, the secondary reaction will increase and the discharge capacity will reduce. Thus the amount of addition of barium nitrite is in a range of 2 to 50% and is advantageously particularly preferably in a range of 5 to 30%. The cause of the increase of the discharge capacity by the addition of barium nitrite is not definite. Probably it may be based on the fact that barium nitrite will act on an oxidized film produced on the surface of the negative plate 1c to break it and reduce the internal resistance. Even if such other nitrite as potassium nitrite or lithium nitrite is added instead of barium nitrite, the discharge capacity will not increase. The discharge capacity increase may be up to about 30%. The result is an effect peculiar to barium nitrite. Further, we have discovered lithium chromate as another substance having an effect of increasing the discharge capacity instead of barium nitrite. As no increase of the discharge capacity will be recognized at all even if any other chromate is added, it is an effect peculiar to lithium chromate. The amount of addition of this lithium chromate is in a range of 2 to 50% and is advantageously in a range of 5 to 30% substantially the same as in the case of barium nitrite.

Another feature of the present invention is to arrange a fusible heat reservoir in the middle of a cell stack made by alternately stacking many cells 1 and pellets 2. For this fusible heat reservoir, there can be used a substance having a melting point higher than the melting point of the electrolyte of the cell such as, for example, a mixture of calcium chloride and lithium chloride (of a eutectic point of 496°C), of calcium chloride and sodium chloride (of a eutectic point of 505°C), of lithium chloride and sodium chloride (of a eutectic point of 552°C) or of calcium chloride and potassium chloride (of a eutectic point of 600°C) in case a eutectic mixture (of a melting point of 352°C) of potassium chloride and lithium chloride is used for the electrolyte of the cell. Particularly a substance having a melting point of 500° to 600°C, which is near the optimum operating temperature of the cell is more preferable. The calorie of the heat pellet adjacent to the fusible heat reservoir is preferably larger than that of the heat pellet not adjacent to it and substantially less than twice as large. It has the effect of improving the performance. Thus, by the fusible heat reservoir arranged substantially in the middle of the above mentioned cell stack, the temperature of the electrolyte of the cell can be maintained for a long time at a temperature near its melting point due to the heat of fusion of the fusible heat reservoir. Therefore, there are effects that the discharge voltage is very flat during the discharge period and that the discharge duration is comparatively long.

Figure 3:
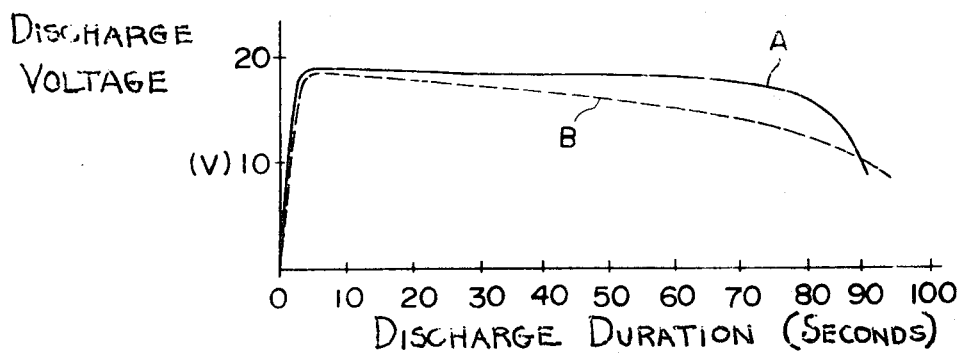
FIG. 3 shows a comparison of discharge characteristics curves of a thermal battery of the present invention and a conventional one.

FIG. 3 is a discharge characteristics curve diagram of the voltage-duration of thermal batteries. The discharge voltage (in V) is shown on the ordinate and the discharge duration (in seconds) is shown on the abscissa. The curve A is of a thermal battery of the present invention wherein two sets of 10 series cells each are connected electrically in parallel and a fusible heat reservoir is interposed between the respective sets. The curve B is of a conventional thermal battery wherein there are the same number of cells. The discharging conditions are that the discharge temperature is −30°C the load resistance is 4 ohm and the ending voltage is up to 16V. The discharge time is about 80 seconds in A of the present invention and is about 60 seconds in B of the conventional thermal battery. In comparing both of them, it can be easily understood that the conventional thermal battery showing the curve B is very inferior in its performance but that the thermal battery of the present invention showing its curve A is comparatively favorable in the performance.

It is evident that various modifications are possible in the range not deviating from the spirit of the present invention and that the present invention is never limited to the above described embodiments. For example, in the thermal battery shown in FIG. 3, a fusible heat reservoir is arranged between the cells of a set of 10 series cells but, in a thermal battery formed of more than 10 cells, a plurality of fusible heat reservoirs can be arranged at any required intervals.

What is claimed is:

1. A thermal battery, comprising:
   a casing;
   a plurality of electrical battery cells disposed in a column within said casing, each said cell including a positive plate, a negative plate and an electrolyte layer between said positive and negative plates;
   a plurality of heat generating pellets for actuating said plurality of cells;
   at least one heat reservoir;
   each of said electrolyte layers comprising a eutectic mixture of potassium chloride and lithium chloride and an additive selected from the group consisting of barium nitrite and lithium chromate;
   means for conveying electrical energy produced in said cells from said cells and through said casing; and
   means for actuating said plurality of heat generating pellets.

2. A thermal battery as in claim 1 wherein said additive is in the range of 2% to 50% by weight of said electrolyte layer.

3. A thermal battery as in claim 2 wherein said additive is in the range of 5% to 30% by weight of said electrolyte layer.

4. A thermal battery as in claim 3 wherein said additive is barium nitrite forming 30% by weight of said electrolyte layer.

5. A thermal battery as in claim 3 wherein said additive is barium nitrite in a percentage weight of 12% and said eutectic mixture is 48% by weight and wherein said electrolyte further comprises 40% by weight of kaolin powder.

6. A thermal battery as in claim 1 wherein said at least one heat reservoir is a eutectic mixture selected from the group consisting of calcium chloride and lithium chloride, calcium chloride and sodium chloride, lithium chloride and sodium chloride, and calcium chloride and potassium chloride.

7. A thermal battery as in claim 6 wherein each of said positive plates is formed of a substance selected from the group consisting of lead chromate and calcium chromate, each of said negative plates is formed of a substance selected from the group consisting of magnesium and calcium; and each of said heat pellets is formed of a mixture of zirconium and barium chromate.

8. A thermal battery as in claim 6 wherein said at least one heat reservoir consists of a eutectic mixture of calcium chloride and lithium chloride having a eutectic temperature of substantially 496° C., and said eutectic electrolyte mixture has a melting point of substantially 352° C.

9. A thermal battery as in claim 6 wherein said eutectic mixture is calcium chloride and sodium chloride having a eutectic temperature of substantially 505° C., and said eutectic electrolyte mixture has a melting point of substantially 352° C.

10. A thermal battery as in claim 6 wherein said eutectic mixture is lithium chloride and sodium chloride having a eutectic temperature of substantially 552° C., and said eutectic electrolyte mixture has a melting point of substantially 352° C.

11. A thermal battery as in claim 6 wherein said eutectic mixture is calcium chloride and potassium chloride having a eutectic temperature of substantially 600° C., and said eutectic electrolyte mixture has a melting point of substantially 352° C.

12. A thermal battery as in claim 1 wherein said at least one heat reservoir is disposed at substantially the middle of said column of cells and further comprising at least one additional heat generating pellet adjacent said at least one heat reservoir and having a caloric output greater than, but less than twice, the caloric output of each one of said plurality of heat generating pellets.

13. A thermal battery as in claim 12 further comprising an additional heat reservoir disposed at each end of said column of cells and a third heat generating pellet adjacent each said additional heat reservoir.

* * * * *